United States Patent
Nitsan et al.

(10) Patent No.: US 10,452,723 B2
(45) Date of Patent: Oct. 22, 2019

(54) DETECTING MALFORMED APPLICATION SCREENS

(71) Applicant: HEWLETT PACKARD ENTERPRISE DEVELOPMENT LP, Houston, TX (US)

(72) Inventors: Amichai Nitsan, Yehud (IL); Olga Shershevsky, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 218 days.

(21) Appl. No.: 15/336,386

(22) Filed: Oct. 27, 2016

(65) Prior Publication Data
US 2018/0121270 A1    May 3, 2018

(51) Int. Cl.
*G06F 16/95*    (2019.01)

(52) U.S. Cl.
CPC ............... *G06F 16/95* (2019.01)

(58) Field of Classification Search
CPC ............ G06F 11/0751; G06F 11/079; G06F 11/3684; G06F 3/1415; G06F 3/1462; G06F 3/048; G06F 9/45533; G06F 9/451
See application file for complete search history.

(56) References Cited

U.S. PATENT DOCUMENTS

| | | | |
|---|---|---|---|
| 6,219,818 B1* | 4/2001 | Freivald | G06F 17/3089 707/999.001 |
| 6,226,407 B1* | 5/2001 | Zabih | G06T 7/001 382/209 |
| 7,143,088 B2 | 11/2006 | Green et al. | |
| 8,086,953 B1* | 12/2011 | Gabber | G06F 17/30899 707/709 |
| 9,361,032 B2 | 6/2016 | Chiu et al. | |
| 9,479,519 B1* | 10/2016 | Hill | H04L 43/04 |
| 2008/0235163 A1* | 9/2008 | Balasubramanian | G06F 17/30864 706/12 |
| 2014/0172839 A1* | 6/2014 | Christoph | G06F 17/30887 707/723 |
| 2015/0067472 A1* | 3/2015 | Chen | G06F 17/30905 715/234 |
| 2017/0185421 A1* | 6/2017 | Ketola | G06F 3/0484 |
| 2017/0220306 A1* | 8/2017 | Price | G06F 3/0481 |

OTHER PUBLICATIONS

NETBIOSX, "Web Application Fingerprinting," (Web Page), Aug. 1, 2012, 6 pages, available at https://pentestlab.wordpress.com/2012/08/01/web-application-fingerprinting/.

* cited by examiner

*Primary Examiner* — Nadeem Iqbal

(57) ABSTRACT

In some examples, a first skeleton of a layout of a first version of an application screen may be compared with a second skeleton of a layout of a second version of the application screen. It may be determined whether the first version of the application screen is malformed based on the comparison.

22 Claims, 6 Drawing Sheets

DETECTING MALFORMED APPLICATION SCREENS

BACKGROUND

Applications may exhibit errors when used to display application screens on a computing device. For example, an application screen may be a web page that is malformed in a browser, e.g. due to an error during loading of the web page.

BRIEF DESCRIPTION

Some examples are described with respect to the following figures.

Figure 3:
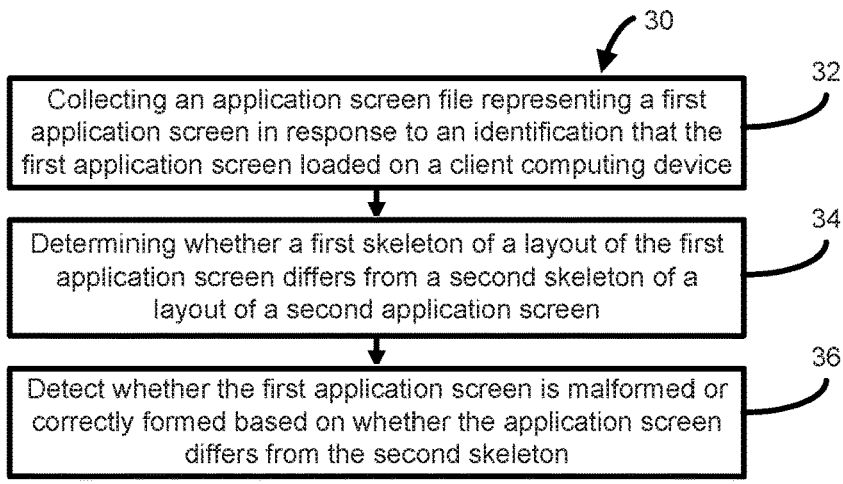
Figure 9A:
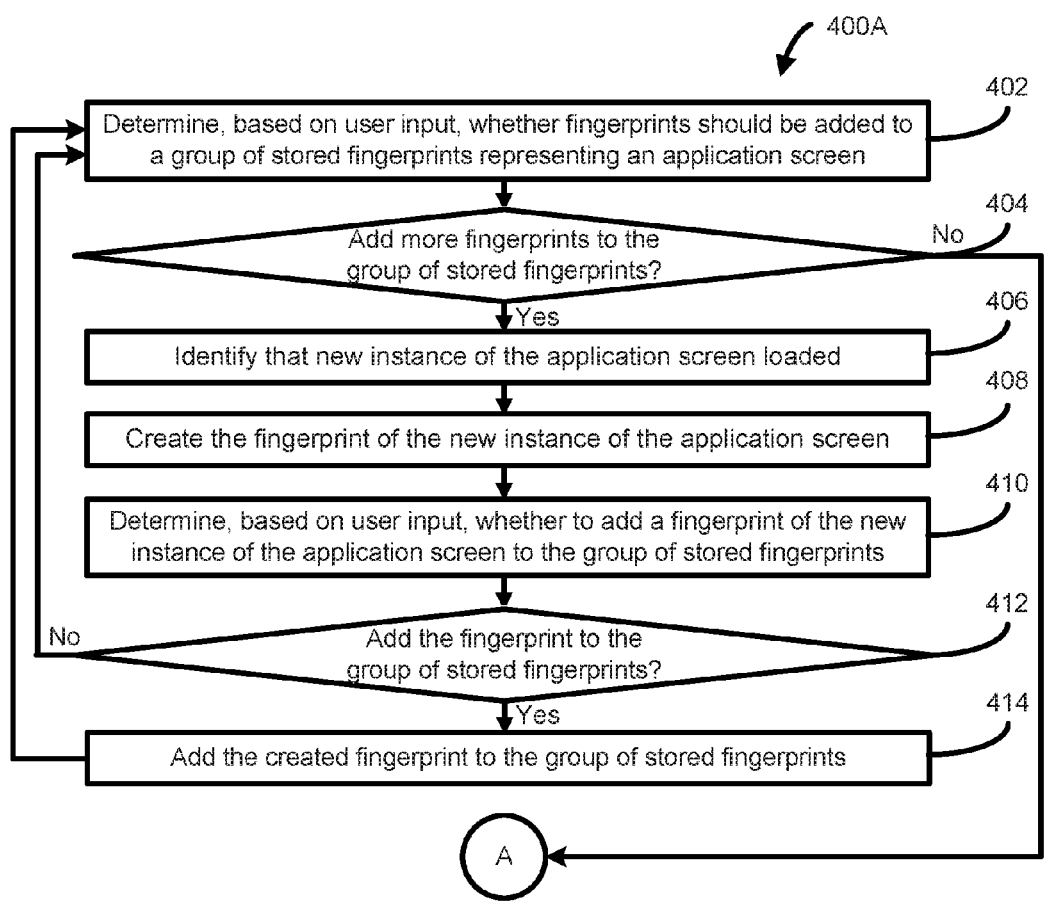
Figure 9B:
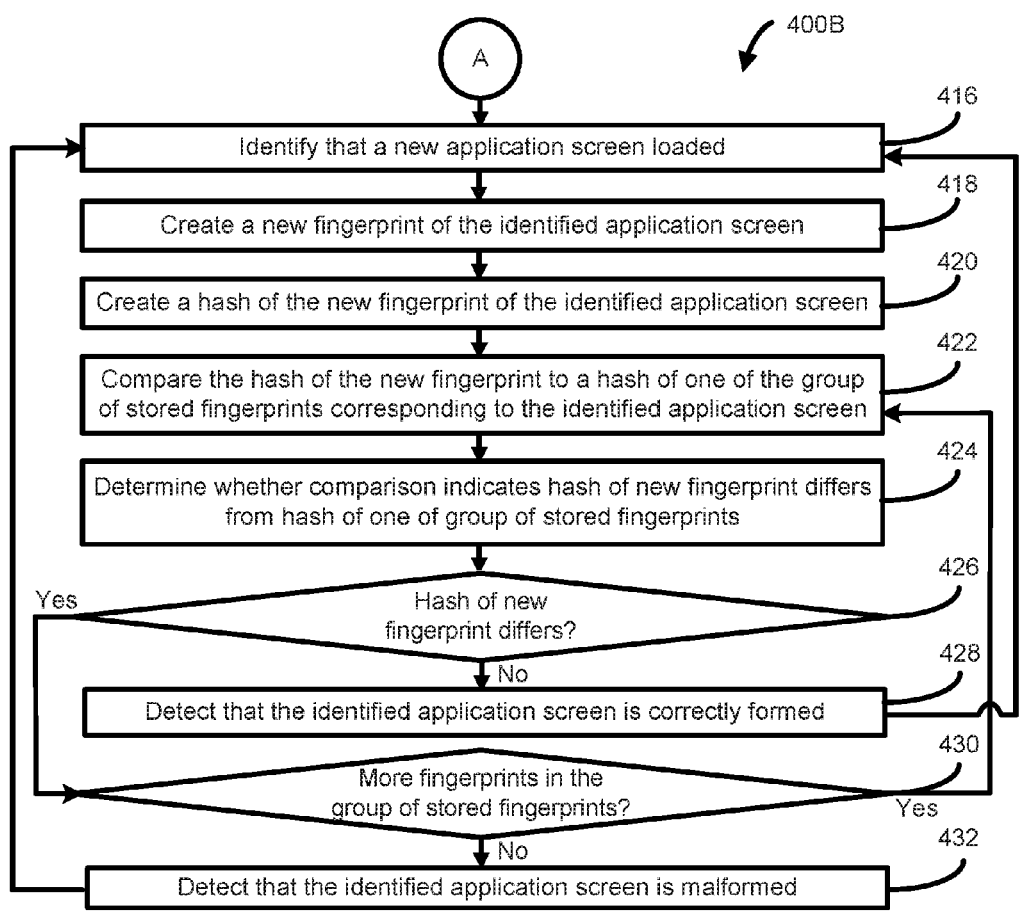

FIGS. 3, 9A, and 9B are flow diagrams illustrating methods according to some examples.

Figure 5:
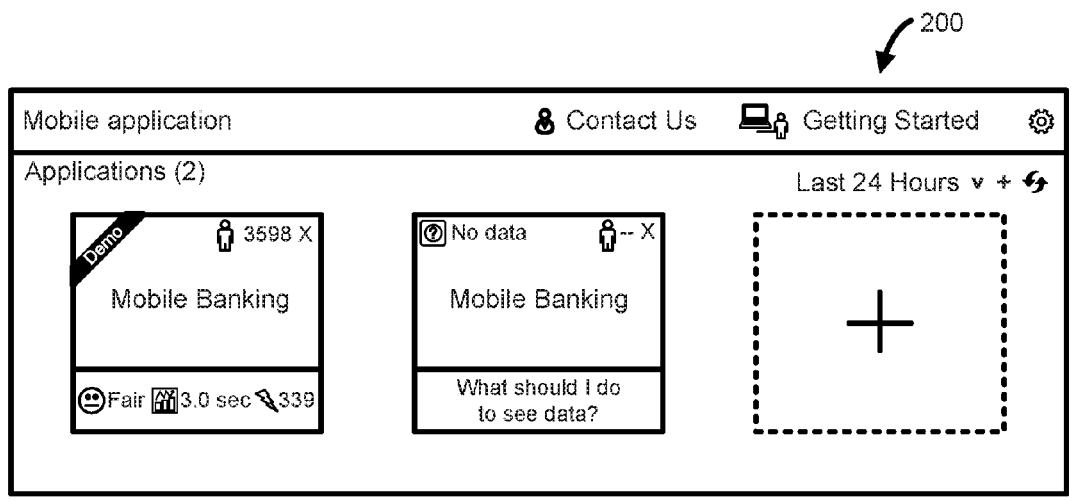

FIG. 5 is a screenshot of a correctly formed version of an application screen according to some examples.

Figure 6:
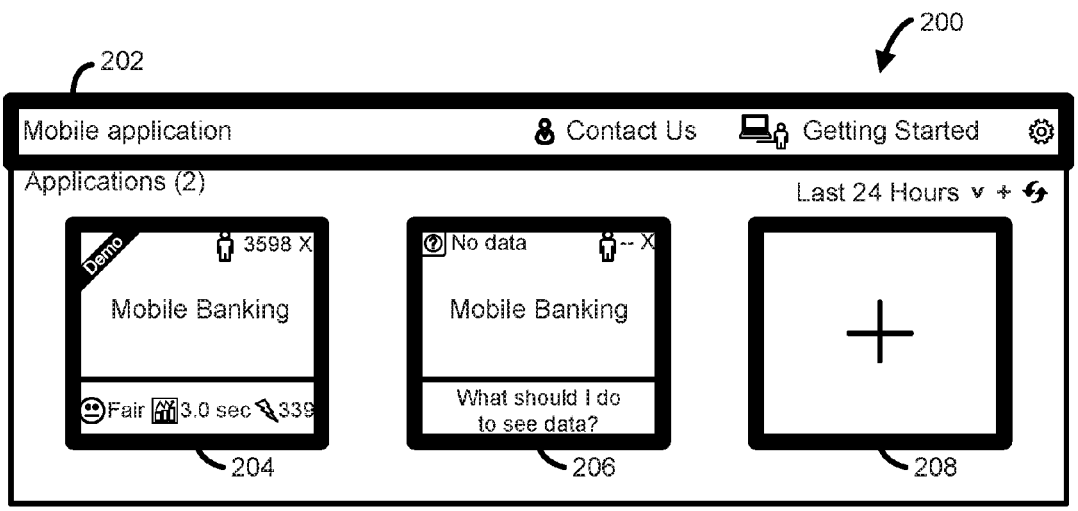

FIG. 6 is a screenshot of the correctly formed version of the application screen of FIG. 5 and its skeleton according to some examples.

Figure 7:
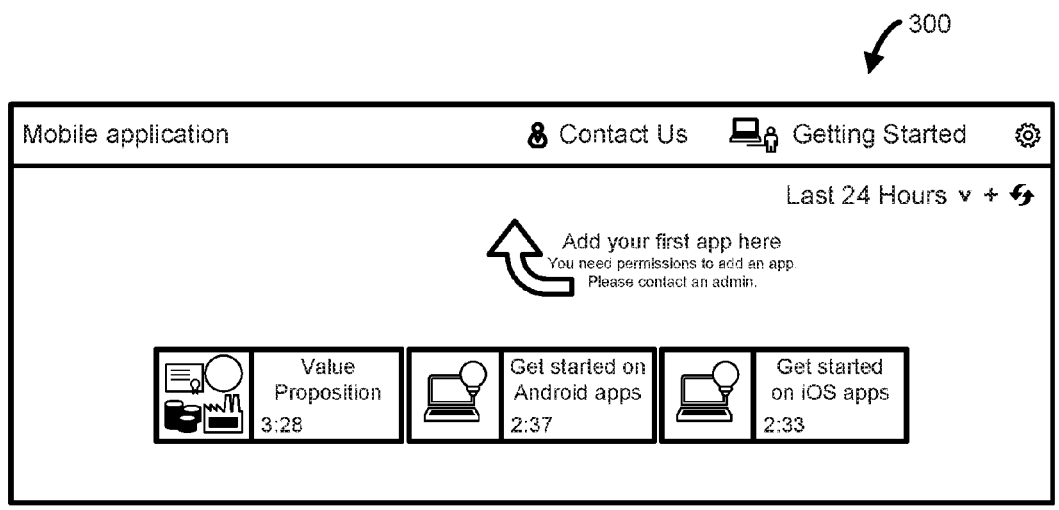

FIG. 7 is a screenshot of a malformed version of an application screen of FIG. 5 according to some examples.

Figure 8:
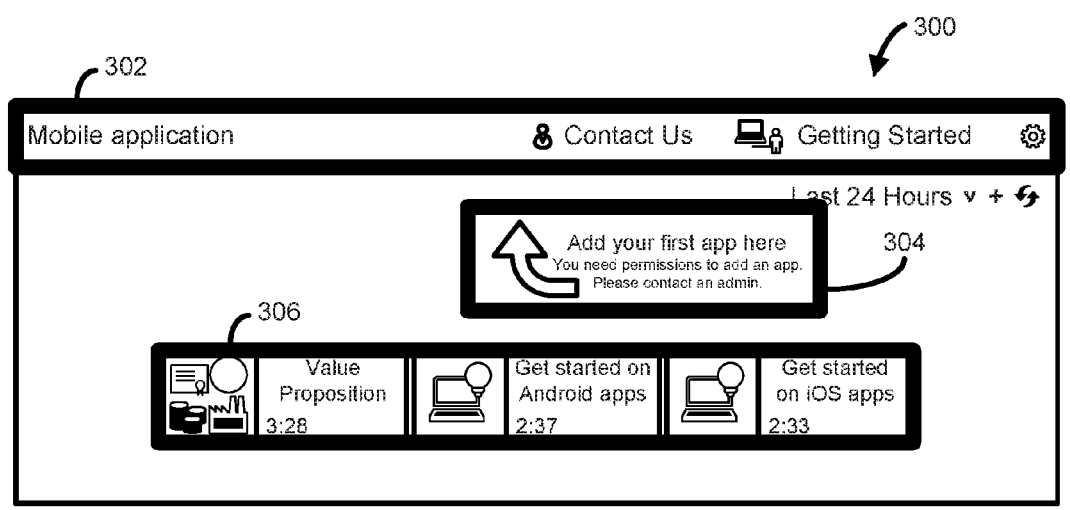

FIG. 8 is a screenshot of the malformed version of an application screen of FIG. 5 and its skeleton according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

In some examples, a new application screen may be displayed in user interface of a computing device. This may occur at the request of a user or automatically. The application screen may be a screen displayed during an execution of an application, such as a desktop application, mobile application, web application, cloud based application, on-premise application, etc. An application screen displayed by a web application is a web page. A sequence of operations may be executed to cause the application screen to display. In the example of a web page, a client request such as an HTTP request may interact with a web server to cause the web page to display. This may involve an execution flow of a web application that occurs across several layers of a computing system, including at a client, server, and database.

However, during this sequence of operations, an error may occur that may result in the application screen being malformed, i.e. not displaying correctly. For example, the application screen may not appear to be structured or rendered correctly in the user interface, e.g. a web page may appear improperly in a web browser. In some examples, this error may occur in an application (e.g. running at a client or server) that causes the application screen to display.

In an example, the error may be an error occurring in code of the application, such as a JavaScript error. In these examples, JavaScript errors may be monitored to identify that the application screen is malformed. However, some JavaScript errors may not result in an application screen being malformed, and therefore application monitoring tools may report false positives, i.e. that an application screen is malformed even if it is not.

In other examples, the error may not be an error occurring in code of the application. For example, other errors may occur, such as an interrupted communication, a server side exception while the application screen is rendering, unavailability of or failure to download an external resource file such as a CSS file or an image file. In these examples, application monitoring tools may lack the ability to identify that the application screen is malformed.

Accordingly, the present disclosure provides examples in which malformed application screens may be detected by storing skeletons of an application screen when the application screen is displayed correctly, and comparing a newly created skeleton of a new instance of the application screen to determine whether the new instance of the application screen is malformed. In some examples, this technique may be successfully detect malformed application screens resulting from a wide variety of errors. It is understood that "detecting" whether an application screen is malformed or correctly formed entails inferring, deducing, estimating, or otherwise determining in some way that the application screen is malformed or correctly formed.

Figure 1:
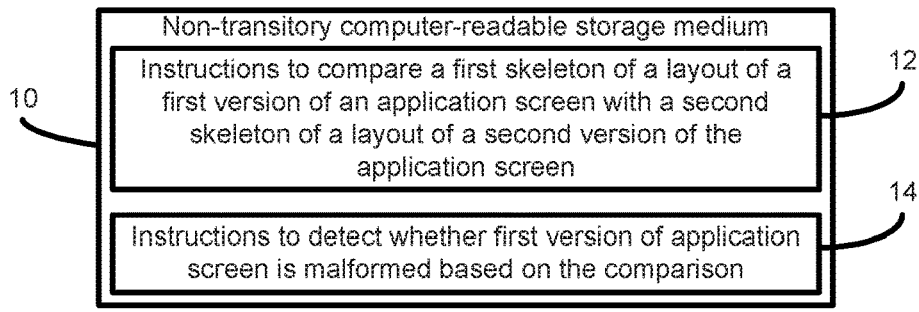
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to compare a first skeleton of a layout of a first version of an application screen with a second skeleton of a layout of a second version of the application screen. The non-transitory computer readable storage medium 10 may include instructions 14 executable by a processor to detect whether the first version of the application screen is malformed based on the comparison.

Figure 2:
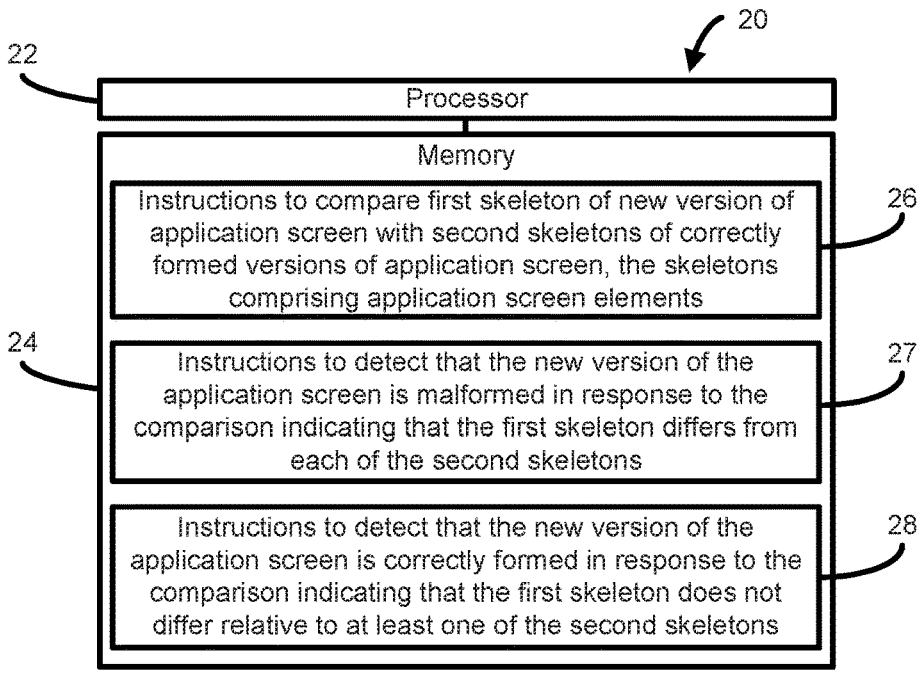
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to compare a first skeleton of a new version of an application screen with second skeletons of correctly formed versions of the application screen, each of the first and the second skeletons comprising a respective plurality of application screen elements. The memory 24 may include instructions 27 executable by the processor to detect that the new version of the application screen is malformed in response to the comparison indicating that the first skeleton differs from each of the second skeletons. The memory 24 may include instructions 28 executable by the processor to detect that the new version of the application screen is correctly formed in response to the comparison indicating that the first skeleton does not differ relative to at least one of the second skeletons.

FIG. 3 is a flow diagram illustrating a method 30 according to some examples. The following may be performed by a processor. The method 30 may include: at 32, collecting an application screen file representing a first application screen in response to an identification that the first application screen loaded on a client computing device; at 34, determining whether a first skeleton of a layout of the first application screen differs from a second skeleton of a layout of a second application screen; and at 36, detect whether the first application screen is malformed or correctly formed based on whether the application screen differs from the second skeleton.

Figure 4:
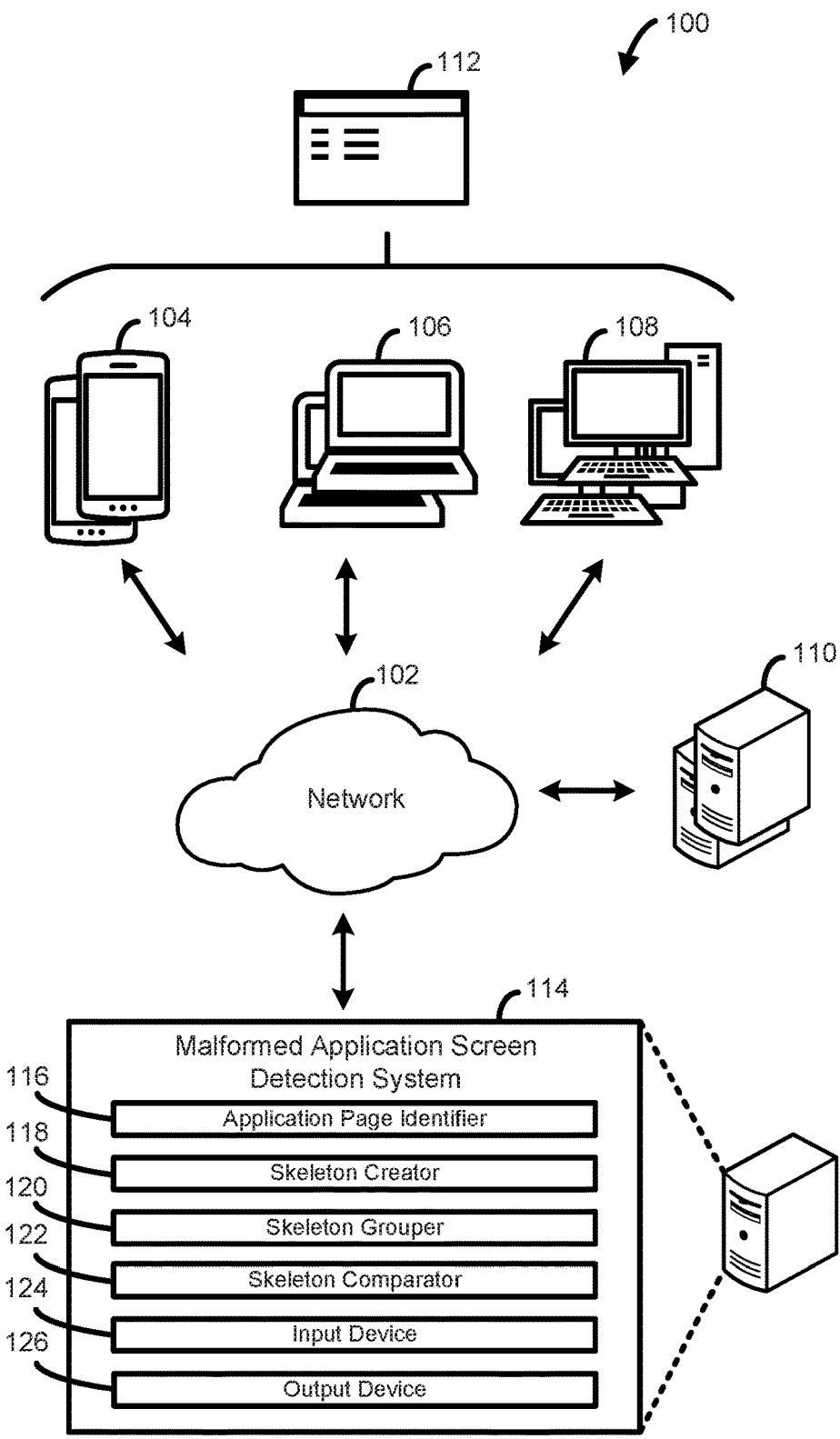

FIG. 4 is a block diagram illustrating a system 100 according to some examples. The system 100 includes a network 102, such as a local area network (LAN), wide area network (WAN), the Internet, or any other network. The system 100 may include multiple client computing devices in communication with the network 102, such as mobile computing devices 104 (e.g. smart phones and tablets), laptop computers 106, and desktop computers 108. Other types of client computing devices may also be in communication with the network 102. The system 100 may also include web servers 110 in communication with the network 102.

The system 100 may include a malformed application screen detection system 114 in communication with the network 102. The malformed application screen detection system 114 may include an application screen identifier 116, skeleton creator 118, skeleton grouper 120, skeleton comparator 122, and malformed application screen determiner 124. In some examples, the malformed application screen detection system 114 may comprise a server computing device, or any other type of computing device. In some examples, the malformed application screen detection system 114 may be part of an administrator computing device to be operated by a user such as an IT professional. The malformed application screen detection system 114 may support direct user interaction. For example, the malformed application screen detection system 114 may include user input device 124, such as a keyboard, touchpad, buttons, keypad, dials, mouse, track-ball, card reader, or other input devices. Additionally, the malformed application screen detection system 114 may include output device 126 such as a liquid crystal display (LCD), video monitor, touch screen display, a light-emitting diode (LED), or other output devices. The output devices may be responsive to instructions to display textual information and/or graphical data.

In some examples, components of the malformed application screen detection system 114, such as the application screen identifier 116, skeleton creator 118, skeleton grouper 120, skeleton comparator 122, and malformed application screen determiner 124, may each be implemented as a computing system including a processor, a memory such as non-transitory computer readable medium coupled to the processor, and instructions such as software and/or firmware stored in the non-transitory computer-readable storage medium. The instructions may be executable by the processor to perform processes discussed herein. In some examples, these components of the malformed application screen detection system 114 may include hardware features to perform processes described herein, such as a logical circuit, application specific integrated circuit, etc. In some examples, multiple components may be implemented using the same computing system features or hardware.

The client computing devices may execute applications, causing display of static or dynamic application screens 112 of the applications to end users of the client computing devices. In examples where the application screens 112 are web pages, web browsers may display these application screens 112 via execution of web applications, e.g. on the web servers 110 and/or on the client computing devices 102, 104, and 106.

An application screen 112 may be rendered based on an underlying structure, such as the Document Object Model (DOM). The structure may comprise various elements, such as images, text, hyperlinks, controls, forms as well as scripts to handle performing functions for a web application implemented to display the application screen 112.

The DOM may comprise a language-independent representation of a plurality of elements associated with a user interface for an application. The DOM may provide for representing and interacting with objects in, for example, HTML, XHTML, and XML based application screens 112. The elements of such application screens 112 may be organized in a tree structure. Objects in the tree structure may be addressed and manipulated by using methods from various programming languages on the objects. In examples where the application screen 112 is a web page, when the DOM is rendered as an application screen 112, a web browser loads the DOM into memory and parses each of the elements in the tree structure to translate at least some of the elements into visible user interface elements as applicable.

In some examples, the application screen identifier 116 may continually collect, e.g. from agents installed at the client computing devices 104, 106, 1028, application screen files storing application screens 112 that were displayed by the client computing devices 104, 106, and 108, and any metadata associated with the application screens 112. As these files are received, the application screen identifier 116 may identify each time that a new application screen 112 has loaded (e.g. each time a web page has loaded in a web browser).

Application screens are understood herein to refer to any type of application screen that can be displayed as part of execution of an application. For example, web applications may cause the loading of a real web page 112 in a web browser. In some examples, where the application screen is a web page, loading a new real web page 112 may be associated with a change in the Uniform Resource Locator (URL) shown in the web browser 112, but in other examples new real web pages 112 may be loaded while the URL remains the same. The application screen identifier 116 may identify real web pages 112 by detecting load events by the web browser.

In some examples, web applications may cause the loading of a virtual web pages in addition to real web pages. A virtual web page is part of a single-page application (SPA), which is a web application or website that fits on a single application screen, where the code (e.g. HTML, JavaScript, and CSS) is retrieved with a single page load, or resources are dynamically loaded and added to the application screen as needed, e.g. in response to user actions. A virtual web page may be created by a content change in a real web page, and therefore may not be considered as its own real web page by the web browser. The application screen identifier 116 may identify virtual web pages by detecting routing events associated with single-page frameworks used by the virtual web pages.

In some examples, an application screen 112 may also be identified when a time-out mechanism is triggered, for example because application screen transmission to a client computing device is interrupted, causing there to be no load event. For example, a time-out mechanism because sometimes the application screen transmission (e.g. transmission of web page) is interrupted and there is no load event.

The application screen identifier 116 may also identify other types of application screens 112 other than those described above. Once any type of application screen 112 is identified, skeleton creation may be triggered.

In some examples, the skeleton creator 118 may create, for each identified application screen 112, a skeleton of the layout of the application screen 112. A skeleton may comprise a skeleton of the layout of an application screen 112. In some examples, the skeleton creator 118 may create a listing of visible application screen elements associated with an application screen user interface, extract each of the plurality of application screen elements from the DOM associated with the application screen 112, and then create the skeleton using the extracted application screen elements. The skeleton may then comprise a list comprising a subset of elements from the Document Object Model (DOM) associated with the application screen 112.

In some examples, the skeleton creator 118 may determine whether each of a plurality of the DOM elements comprises a user visible element. User visible elements may comprise elements actually displayed in a user interface of the application. In some examples, visibility may be determined according to an application programming interface (API) query, a visibility property, and a layer property. For example, an element may comprise a method such as "isVisible" that returns a Boolean value of true if the element is currently displayed or false if the element is not currently displayed. In another example, a CSS style property of "hidden" may comprise a visibility property indicating that the element is not currently displayed. Another example visibility property may comprise a size property; a size below a minimum threshold, such as 5×5 pixels, may be determined to comprise a non-visible element, while larger sizes may be associated with visible elements. A layer property may identify whether an element is in front of another element sharing the same display space in the user interface. The "front" element may comprise a visible element while the element behind the front element may be determined to not be visible.

The skeleton creator 118 may then hash each created skeleton into a fingerprint, and classify the skeleton and/or fingerprint for a particular application screen 112 with an identifier associated with the particular application screen 112.

For each skeleton, the skeleton grouper 120 may store, in its non-transitory computer readable medium, the skeleton, fingerprint, or both, along with an identifier associated with the application screen 112 from which the skeleton was generated. The skeleton generator 118 may group skeletons associated with the same identifier into skeleton groups. A skeleton group may represent a variety of correctly formed versions of the application screen 112.

The skeleton groups may be created based on user input entered by a user into the input device 124 during a setup phase. For example, each time an application screen is identified, the skeleton grouper 120 may cause the output device 126 to indicate that an application screen 112 has been identified, and to display the identified application screen 112, its skeleton, a representation of a skeleton group corresponding to the identified application screen 112 (based on a match of the identifier of the identified application screen 112 and the identifier of the skeleton group), and each application screen and/or skeleton currently stored in the skeleton group.

The user may then determine whether to add the skeleton corresponding to the identified application screen 112 to the skeleton group by visually comparing the skeleton of the identified application screen 112 with each of the skeletons in the skeleton group (or compare the identified application screen 112 with each of the application screens represented by skeletons in the skeleton group).

In some examples, these comparisons may be to check that the identified skeleton corresponding to the identified application screen 112 is not already stored in the skeleton group. If the identified skeleton is already stored, then the identified skeleton corresponding to the identified application screen 112 need not be added to the group.

If the skeleton corresponding to the identified application screen 112 is not identical to any skeletons already stored in the skeleton group, and if the user determines that the identified application screen 112 is malformed, the user may provide user input the input device 124 specifying that the skeleton corresponding to the identified application screen 12 is not to be added to the skeleton group.

If the skeleton corresponding to the identified application screen 112 is not identical to any skeletons already stored in the skeleton group, and if the user determines that the identified application screen 112 is correctly formed, the user may provide user input to the input device 124 specifying that the skeleton corresponding to the identified application screen 112 is to be added to the skeleton group. Skeleton groups may contain multiple skeletons for an application screen 112 because the application screen 112 can be correctly formed in a number of different ways. For example, an application screen 112 may be displayed differently in a mobile computing device or a desktop computing device, may be displayed differently depending on the resolution of a computer screen, may have a variable form factor depending on the sizing of the window displaying an application (e.g. the sizing of a web browser), may be displayed differently depending on the state of the application screen 112 e.g. the application screen 112 may include lists that may be populated with items or may be empty. Application screens 112 may vary in other ways while remaining correctly formed. Therefore, a skeleton group may, after a sufficient input of skeletons, represent a wide variety of correctly formed versions of the application screen 112.

In some examples, there may be no skeleton group for the identified application screen 112. In these examples, the user may be prompted on the output device 126 on whether to create a new group for the identified application screen. Then, the user may provide user input to the input device 124 specifying that a new skeleton group is to be created for the identified application screen 112, and the skeleton corresponding to the identified application screen 112 is to be added to the newly created skeleton group.

In some examples, skeleton grouper 120 may be used to continually create and update skeleton groups for a variety of application screens 112.

In some examples, in an operation phase, the skeleton comparator 122 may perform a comparison of the skeleton of an identified application screen 112 with skeletons in a skeleton group associated with the identified application screen 112. Each comparison may involve checking whether there is a difference between the skeletons. In some examples, this skeleton comparison may be performed by comparing fingerprints generated by hashing the skeletons, rather than by comparisons the skeletons directly. In other examples, the skeletons may be compared directly, e.g. without fingerprints being generated. In the examples where skeletons are compared directly, each comparison of two skeletons may involve an element by element comparison of the two skeletons to determine how many differences exist between the skeletons. The comparison may determine, for example, which and/or how many elements are present in one skeleton that are not present in another skeleton and/or what changes occurred in the display of an element between the first skeleton and the second skeleton. Such changes may comprise, for example, a change in visibility for an element, a change in size, a movement of the element(s) within a user interface, and/or a change in structure of the element, e.g. after a user clicks on a menu item of a menu, the menu may expand to display a sub-menu.

In some examples, the skeleton comparator 122 may, based on the comparison of the skeletons, detect (e.g. determine) whether the identified application screen 112 is malformed. This determination may be based on whether the comparison indicates that the first skeleton differs from the second skeleton. In some examples, the comparison may be a binary determination (i.e. the skeletons differ or they do not). In other examples, the comparison may be a determination of whether the skeletons differ by a threshold amount. In these examples, a determination that the identified application screen 112 is malformed may require that the overall skeletons differ by greater than some amount, such as 70% and/or may require that at least one large element, such as a central content element and/or an element occupying more than 30% of the visual space of the user interface, has changed.

In some examples, the skeleton of the identified application screen 112 may be compared one-by-one with each of the skeletons in the skeleton group associated with the identified application screen 112. If the skeleton of the identified application screen 112 does not differs from at least one of the skeletons in the skeleton group (or in other examples, differs from at least one of the skeletons by less than the threshold amount), then the skeleton comparator 112 may determine that the identified application screen 112 is correctly formed. If the skeleton of the identified application screen 112 differs from each of the skeletons in the skeleton group (or in other examples, differs from at least one of the skeletons by at least the threshold amount), then the skeleton comparator 112 may determine that the identified application screen 112 is malformed.

FIG. 5 is a screenshot of a correctly formed version 200 of an application screen according to some examples. FIG. 6 is a screenshot of the correctly formed version 200 of the application screen of FIG. 5 and its skeleton according to some examples. The skeleton may be created using the skeleton creator 118 and stored in a skeleton group by the skeleton grouper 120. In FIG. 6, the skeleton is shown as having four elements 202, 204, 206, and 208.

FIG. 7 is a screenshot of a malformed version 300 of the application screen of FIG. 5 according to some examples. FIG. 8 is a screenshot of the malformed version 300 of the application screen of FIG. 5 and its skeleton according to some examples. The skeleton may be created using the skeleton creator 118 based on a newly identified application screen 112. In FIG. 8, the skeleton is shown as having three elements 302, 304, and 306. Given the extent of differences between the skeleton of FIG. 6 and the skeleton of FIG. 8, e.g. different number, sizes, and locations of elements, the skeleton comparator 122 may determine that these skeletons differ, and therefore determine that the version 300 of the application screen in FIGS. 7 and 8 is malformed. In these examples, the malformed version 300 of the application screen may have resulted from a failure to download resources associated various application widgets displayed in the application screen where the skeleton elements 204 and 206 are shown in FIG. 6.

FIGS. 9A and 9B are flow diagrams illustrating methods 400A and 400B according to some examples. Together, FIGS. 9A and 9B show a method of detecting malformed application screens, with FIG. 9A representing a setup phase and FIG. 9B representing an operation phase. In some examples, the orderings shown may be varied, some elements may occur simultaneously, some elements may be added, and some elements may be omitted. In describing FIGS. 9A and 9B, reference will be made to elements described in FIGS. 4-8. In examples, any of the elements described earlier relative to FIG. 4-8 may be implemented in the process shown in and described relative to FIGS. 9A and 9B.

Turning to FIG. 9A, at 402, the skeleton grouper 120 may determine, based on user input to the input device 124, whether additional skeletons should be added to any group of stored skeletons representing any application screens 112. Any relevant processes previously described as implemented by the skeleton grouper 120 to make this determination may be implemented at 402. The method 400 may proceed from 402 to 404.

At 404, if the skeleton grouper 120 determined at 402 that additional skeletons should be added to a group of stored skeletons representing an application screen 122, then the method 400 may proceed from 404 to 406. Otherwise, the method 400 may proceed from 404 to "A" and then to 416 of the operation phase shown in FIG. 9B.

At 406, the application screen identifier 116 may identify that new application screen 112 has loaded (e.g. after the user loaded an application screen on a client computing device). Any processes previously described as implemented by the application screen identifier 116 may be implemented at 406. The method 400 may proceed from 406 to 408.

At 408, the skeleton creator 118 may create a skeleton of the layout of the identified application screen 112. Any processes previously described as implemented by the skeleton creator 118 may be implemented at 408. The method 400 may proceed to 410.

At 410, the skeleton grouper 120 may determine, based on user input to the input device 124, whether the skeleton representing the identified application screen 112 should be added to the group of stored skeletons representing application screen 112. Any relevant processes previously described as implemented by the skeleton grouper 120 to make this determination may be implemented at 410. The method 400 may proceed from 410 to 412.

At 412, if the skeleton grouper 120 determined at 410 that the skeleton representing the identified application screen 112 should be added to the group of stored skeletons representing application screen 112, then the method 400 may proceed from 412 to 414. Otherwise, the method 400 may proceed from 412 to 402.

At 414, the skeleton grouper 120 may add the skeleton representing the identified application screen 112 to the group of stored skeletons representing application screen 112. Any relevant processes previously described as implemented by the skeleton grouper 120 to perform this addition may be implemented at 414. The method 400 may proceed from 414 to 402 to determine whether to add more skeletons to skeleton groups representing application screens 412.

Turning to FIG. 9B, at 416, the application screen identifier 116 may identify that new application screen 112 has loaded in any of the client computing devices 104, 106, or 108. Any processes previously described as implemented by the application screen identifier 116 may be implemented at 416. The method 400 may proceed from 416 to 418.

At 418 and 420, the skeleton creator 118 may create a skeleton of the layout of the identified application screen 112 and may hash the skeleton into a fingerprint. Any processes previously described as implemented by the skeleton creator 118 may be implemented at 418 and 420. The method 400 may proceed from 420 to 422.

At 422 and 424, the skeleton comparator 122 may perform a comparison of the skeleton of an identified application screen 112 with skeletons in a skeleton group associated with the identified application screen 112, and then may determine whether the skeletons differ. Any processes previously described as implemented by the skeleton comparator 122 may be implemented at 418 and 420. The method 400 may proceed from 424 to 426.

At 426, if the skeleton comparator 122 determined that the skeletons differ, then the method 400 may proceed from 426 to 430. Otherwise, the method 400 may proceed from 426 to 428.

At 428, the skeleton comparator 122 may detect that the identified application screen 112 is correctly formed based on the determination that the skeletons do not differ (or in other examples, differ by less than the threshold amount). The method may proceed to from 428 to 418.

At 430, if the skeleton comparator 122 determines that there are more skeletons in the group of stored skeletons corresponding to identified application screen 412, then the method 400 may proceed from 430 to 422 to compare the skeleton of the identified application screen 412 with the another skeleton of the group of stored skeletons corresponding to identified application screen 412. Otherwise, the method 400 may proceed from 430 to 432.

At 432, the skeleton comparator 122 may detect that the identified application screen 112 is malformed based on the determination that each of the skeletons in the group of stored skeletons corresponding to identified application screen 112 differ by at least the threshold amount. The method may proceed to from 432 to 416 to determine whether additional new application screens 416 are malformed.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
based on an object document model, extract a subset of application screen elements of a plurality of application screen elements represented by the object document model to include in a first skeleton of a layout of a first version of the application, wherein extracting the subset of application screen elements comprises:
selecting the subset of application screen elements to include in the first skeleton based on visibilities of the elements represented by the object document model and based on layer properties of the elements represented by the object document model;
compare the first skeleton with a second skeleton of a layout of a second version of the application screen; and
detect whether the second version of the application screen is malformed based on the comparison.

2. The non-transitory computer-readable storage medium of claim 1 wherein to compare the first skeleton with the second skeleton comprises to:
hash the first skeleton into a first fingerprint; and
compare the first fingerprint with a second fingerprint of the second skeleton.

3. The non-transitory computer-readable storage medium of claim 1 wherein the first skeleton comprises one skeleton of a plurality of skeletons, and the instructions when executed by the processor further cause the processor to perform a plurality of individual comparisons of the second skeleton to skeletons of the plurality of skeletons and determine whether the second version of the application is malformed based on the plurality of the individual comparisons.

4. The non-transitory computer-readable storage medium of claim 3 wherein the skeletons of the plurality of skeletons comprise a skeleton associated with a mobile computing device and a skeleton associated with a desktop computing device.

5. The non-transitory computer-readable storage medium of claim 4 further comprising instructions executable by the processor to create the second skeleton based on the document object model.

6. The non-transitory computer-readable storage medium of claim 1 wherein to determine whether the second version of the application screen is malformed based on the comparison comprises to:
determine whether the comparison indicates that the first skeleton differs from the second skeleton by a threshold amount; and
determine that the second version of the application screen is malformed in response to the first skeleton differing from the second skeleton by the threshold amount.

7. The non-transitory computer-readable storage medium of claim 1 wherein the first skeleton is included in a group of skeleton corresponding to correctly formed versions of the application screen, wherein the first version of the application screen is one of the correctly formed versions of the application screen.

8. The non-transitory computer-readable storage medium of claim 7 wherein to compare comprises to compare the second skeleton one-by-one with each skeleton of the group of skeletons until one of the following occurs:
one of the comparisons indicates that the second skeleton does not differ from a skeleton of the group of skeletons, wherein to compare comprises to determine that the second version of the application screen is correctly formed based on the one of the comparisons; or
the comparisons indicate that the second skeleton differs from each skeleton of the group of skeletons, wherein to compare comprises to determine that the second version of the application screen is malformed based on the comparisons.

9. The non-transitory computer-readable storage medium of claim 8 wherein the correctly formed versions of the application screen include versions corresponding to different types of client computing devices to host applications that are used to generate the application screen.

10. The non-transitory computer-readable storage medium of claim 8 wherein the correctly formed versions of the application screen include versions corresponding to different computer screen resolutions or window sizes.

11. The non-transitory computer-readable storage medium of claim 8 wherein the correctly formed versions of the application screen include versions corresponding to different states of the application screen.

12. The non-transitory computer-readable storage medium of claim 8 further comprising instructions to add a skeleton to the group of skeletons in response to user input representing a determination that the added skeleton represents one of the correctly formed versions of the application screen.

13. The non-transitory computer-readable storage medium of claim 12 further comprising instructions to, in response to user input, create the group of skeletons and stop adding skeletons to the group of skeletons.

14. The non-transitory computer-readable storage medium of claim 1 further comprising instructions executable by the processor to receive the second version of the application screen from a client computing device hosting a web browser that is to display the application screen, the application screen comprising a web page, the client computing device being separate from a computing device that includes the non-transitory computer-readable storage medium.

15. The non-transitory computer-readable storage medium of claim 14 wherein to receive comprises to receive the second version of the application screen in response to detection of a load event triggering display of the second version of the application screen on the web browser, wherein the second version of the application screen comprises a real web page.

16. The non-transitory computer-readable storage medium of claim 14 wherein to receive comprises to receive the second version of the application screen in response to detection of a routing event triggering display of the second version of the application screen on the web browser, wherein the second version of the application screen comprises a virtual web page.

17. A system comprising:
a processor; and
a memory comprising instructions executable by the processor to:
based on an object document model, extract a subset of application screen elements of a plurality of application screen elements represented by the object document model to include in a first skeleton of a layout of a new version of the application, wherein extracting the subset of application screen elements comprises:
selecting the subset of application screen elements to include in the first skeleton based on visibilities of the elements represented by the object document model and based on layer properties of the elements represented by the object document model;
compare the first skeleton with second skeletons of correctly formed versions of the application screen, each of the second skeletons comprising a respective plurality of application screen elements; and
detect that the new version of the application screen is malformed in response to the comparison indicating that the first skeleton differs from each of the second skeletons; and
detect that the new version of the application screen is correctly formed in response to the comparison indicating that the first skeleton does not differ relative to at least one of the second skeletons.

18. A method comprising:
by a processor:
based on an object document model, extract a subset of application screen elements of a plurality of application screen elements represented by the object document model to include in a first skeleton of a layout of a first version of the application, wherein extracting the subset of application screen elements comprises:
selecting the subset of application screen elements to include in the first skeleton based on visibilities of the elements represented by the object document model and based on layer properties of the elements represented by the object document model;
collecting an application screen file representing a second version of the application screen in response to an identification that the second version of the application screen is loaded on a client computing device;
determining whether the first skeleton differs from a second skeleton of a layout of the second version of the application screen; and
detecting whether the second version of the application screen is malformed or correctly formed based on whether the first skeleton differs from the second skeleton.

19. The method of claim 18 wherein the first application screen comprises a first web page and the second application screen comprises a second web page.

20. The non-transitory computer-readable storage medium of claim 1 wherein the subset of application screen elements comprises a given application screen element that appears in the layout of the first version of the application and in the layout of the second version of the application screen, and the instructions, when executed by the processor, further cause the processor to determine a change in a visibility of the given application screen element between the first and second versions based on a comparison of the first skeleton and the second skeleton.

21. The non-transitory computer-readable storage medium of claim 1 wherein the subset of application screen elements comprises a given application screen element that appears in the layout of the first version of the application and in the layout of the second version of the application screen, and the instructions, when executed by the processor, further cause the processor to determine a movement of the given application screen element between the first and second versions based on a comparison of the first skeleton and the second skeleton.

22. The non-transitory computer-readable storage medium of claim 1 wherein the instructions, when executed by the processor, further cause the processor to select the subset of application screen elements to include in the first skeleton based on sizes of the elements represented by the object document model.

* * * * *